(12) United States Patent  
Ma et al.

(10) Patent No.: US 7,924,350 B2
(45) Date of Patent: Apr. 12, 2011

(54) CAPACITANCE TYPE TOUCH PANEL (75) Inventors: Mei-Sheng Ma, Hsinchu (TW);
Kuo-Hsing Cheng, Hsinchu (TW);
Hsin-Hung Lee, Hsinchu (TW);
Meng-Hsiang Chang, Hsinchu (TW);
Yuan-Chun Wu, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 851 days.

(21) Appl. No.: 11/871,559

(22) Filed: Oct. 12, 2007

(65) Prior Publication Data

US 2009/0096760 A1 Apr. 16, 2009

(51) Int. Cl.
*G02F 1/1335* (2006.01)
(52) U.S. Cl. .......................................................... 349/12
(58) Field of Classification Search .................... 349/12; 345/173

See application file for complete search history.

(56) References Cited

U.S. PATENT DOCUMENTS

| | | | |
|---|---|---|---|
| 4,775,765 A | 10/1988 | Kimura et al. | |
| 5,568,292 A * | 10/1996 | Kim | 349/110 |
| 6,057,903 A | 5/2000 | Colgan et al. | |
| 6,177,918 B1 | 1/2001 | Colgan et al. | |
| 6,259,490 B1 | 7/2001 | Colgan et al. | |
| 6,876,355 B1 | 4/2005 | Ahn et al. | |
| 7,084,933 B2 | 8/2006 | Oh et al. | |

FOREIGN PATENT DOCUMENTS

| | | |
|---|---|---|
| CN | 1119694 A | 4/1996 |
| JP | 8-314633 A | 11/1996 |

* cited by examiner

*Primary Examiner* — Dung T. Nguyen
(74) *Attorney, Agent, or Firm* — Tim Tingkang Xia; Morris, Manning & Martin, LLP (57) ABSTRACT

The present invention relates to a liquid crystal display (LCD). The LCD includes a plurality of display units formed with a first substrate, a color matrix formed on the first substrate, and a common electrode formed on the color matrix, a second substrate spaced from the first substrate, a pixel electrode matrix formed on the second substrate, a liquid crystal material disposed between the common electrode and the pixel electrode matrix. The LCD includes a touch sensing member integrated onto the color matrix of the first substrate.

19 Claims, 7 Drawing Sheets

CAPACITANCE TYPE TOUCH PANEL

FIELD OF THE INVENTION

The present invention relates generally to a liquid crystal display (LCD), and more particularly to an LCD having a dual functional touch sensing device integrated with a color matrix of the LCD.

BACKGROUND OF THE INVENTION

Touch sensing technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system. A touch sensing device typically includes a controller, a sensing circuit having a plurality of touch sensors and a network of control lines electrically connecting the plurality of touch sensors to the controller, and a touch panel associated with the plurality of touch sensors.

There are different types of touch sensing devices available for detection of a touch location. One is a resistive-type touch sensing device that includes two layers of transparent conductive material, such as a transparent conductive oxide, separated by a gap. When touched with sufficient force, one of the conductive layers flexes to make contact with the other conductive layer. The location of the contact point is detectable by a controller that senses the change in resistance at the contact point. In response, the controller performs a function, if any, associated with the contact point.

Another one is a capacitive-type touch sensing device. The capacitive-type touch sensing device can be classified into two types: an analog capacitive sensing device, which uses a contiguous resistive layer, and a projected capacitive sensing device, which uses patterned conductive layers (electrodes).

In a projected capacitive touch device, the touch sensor employs a series of patterned electrodes that are driven with a signal from a controller. Similarly, a location of the contact point can be derived from currents flowing through one or more corresponding electrodes toward the touch point responsive to the touch with sensing the capacitance induced by a user's finger. A finger touch to the sensor provides a capacitive couple from the conductive layer to the body. The location of the contact point is detectable by a controller that measures a change in a capacitively coupled electrical signal at the touch location. Accordingly, the controller performs a function, if any, associated with the touch location.

Typically, an integration of a touch sensing device with a display, such as an LCD, is to attach the touch sensing device onto a LCD panel or monitor, which inevitable increases the size and weight of the display.

Therefore, a heretofore unaddressed need exists in the art to address the aforementioned deficiencies and inadequacies.

SUMMARY OF THE INVENTION

The present invention, in one aspect, relates to an LCD. In one embodiment, the LCD includes a first substrate, a first coordinate detecting layer having a plurality of X electrodes parallel and regular-spacingly formed on the first substrate along an X-direction, an insulating layer formed on the first coordinate detecting electrode layer, a second coordinate detecting layer having a plurality of Y electrodes parallel and regular-spacingly formed on the insulating layer along a Y-direction that is substantially perpendicular to the X-direction, a color filtering matrix having a plurality of red (R), green (G) and blue (B) color pads, each color pad formed on the first substrate in a corresponding space defined by X electrodes or Y electrodes, a transparent overcoat layer formed on the color filtering matrix and uncovered portions of the insulating layer and the plurality of Y electrodes, and a common electrode formed on the transparent overcoat layer. The common electrode is formed of a thin transparent layer of a conductive material. The insulative layer is formed of a transparent, non-conductive material.

The LCD further includes a second substrate arranged to be substantially parallel to the first substrate, a pixel layer having a plurality of pixel electrodes and a plurality of semiconductor devices formed on the second substrate, and a liquid crystal material disposed between the common electrode and the pixel layer. The plurality of semiconductor devices comprises a plurality of thin film transistors (TFTs), each TFT being electrically coupled to a corresponding pixel electrode.

In one embodiment, each of the first substrate and the second substrate is formed of a transparent material. The first substrate and the second substrate are aligned such that each color pad on the first substrate is positioned opposite a corresponding pixel electrode on the second substrate, and the plurality of X electrodes and the plurality of Y electrodes on the first substrate are positioned opposite the plurality of semiconductor devices on the second substrate.

In one embodiment, each of the plurality of X electrodes and the plurality of Y electrodes is formed of a non-transparent, conductive material. The plurality of X electrodes and the plurality of Y electrodes are configured to be a black matrix.

Each of the plurality of X electrodes and the plurality of Y electrodes is associated with coordinates of the first substrate at which the electrode is located. When the first substrate is touched, the touch location at the first substrate is detectable by measuring a signal generated responsively by one or more of the plurality of X electrodes and the plurality of Y electrodes associated with the touch location.

In another aspect, the present invention relates to an LCD, in one embodiment, the LCD includes a first substrate having a first surface and an opposite, second surface, and a color filtering layer formed on the first surface of the first substrate. The color filtering layer is patterned in the form of a color matrix having a plurality of R, G, B color pads aligned along an X-direction and a Y-direction that is substantially perpendicular to the X-direction.

Furthermore, the LCD includes a touching sensing member integrated with the color matrix for detecting a location of a touch point in the first substrate, a transparent overcoat layer formed on the color filtering layer, and a common electrode formed on the transparent overcoat layer.

Moreover, the LCD includes a second substrate spaced from the first substrate, a pixel electrode layer formed on the second substrate, and a liquid crystal material disposed between the common electrode and the pixel electrode layer.

In one embodiment, the touch sensing member includes a plurality of X electrodes parallel and regular-spacingly aligned along the X-direction, and a plurality of Y electrodes parallel and regular-spacingly aligned along the Y-direction. The touch sensing member may further include an insulating layer formed between the plurality of X electrodes and the plurality of Y electrodes.

In one embodiment, the touch sensing member is formed on the first surface of the first substrate such that the plurality of X electrodes and the plurality of Y electrodes are interleaved with the plurality of R, G, and B color pads of the color matrix. The plurality of X electrodes and the plurality of Y electrodes are formed of a non-transparent, conductive material, whereby the touch sensing member is corresponding to a black matrix.

In another embodiment, the touch sensing member is formed on the second surface of the first substrate such that any two neighboring X electrodes and two neighboring Y electrodes crossover the two neighboring X electrodes define an area on the second surface opposite a corresponding color pad on the second surface of the first substrate. In one embodiment, the plurality of X electrodes and the plurality of Y electrodes are formed of a non-transparent, conductive material, whereby the touch sensing member is corresponding to a black matrix. In another embodiment, the plurality of X electrodes and the plurality of Y electrodes are formed of a transparent, conductive material, and the color matrix further comprises a black matrix interleaved with the plurality of R, G, and B color pads.

In one embodiment, the touch sensing member includes a touch sensor matrix formed on the second surface of the first substrate, the touch sensor matrix having a plurality of sensor units, and the plurality of sensor units being formed of a transparent, conductive material and electrically connected in series aligned along the X-direction and the Y-direction, where each touch sensor unit is associated with at least one display unit. The at least one display unit is defined by a corresponding color pad.

In yet another aspect, the present invention relates to an LCD having a plurality of display units formed with a first substrate, a color matrix formed on the first substrate, and a common electrode formed on the color matrix, a second substrate spaced from the first substrate, a pixel electrode matrix formed on the second substrate, a liquid crystal material disposed between the common electrode and the pixel electrode matrix, where the color matrix includes a plurality of R, G, and B color pads aligned along an X-direction and a Y-direction, and where each color pad is associated with a display unit. In one embodiment, the LCD further comprises a touch sensing member integrated onto the first substrate.

In one embodiment, the touch sensing member comprises a plurality of X electrodes parallel and regular-spacingly aligned along the X-direction, and a plurality of Y electrodes parallel and regular-spacingly aligned along the Y-direction, where the touch sensing member is formed such that the plurality of X electrodes and the plurality of Y electrodes are interleaved with the plurality of R, G, and B color pads of the color matrix.

In another embodiment, the touch sensing member comprises a touch sensor matrix formed on the first substrate, the touch sensor matrix having a plurality of sensor units, and the plurality of sensor units being formed of a transparent, conductive material and electrically connected in series aligned along the X-direction and the Y-direction, where each touch sensor unit is associated with at least one display unit.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 1(*a*)-1(*e*) show schematically a liquid crystal display (LCD) with an integrated touch sensing device according to one embodiment of the present invention: 1(*a*) a partially top view, 1(*b*)-1(*d*) a partially cross-sectional view along A-A', B-B' and C-C' lines, respectively, and 1(*e*) a partially cross-sectional view;

FIG. 2(*a*)-2(*c*) show schematically 2(*a*)-2(*c*) different cross-sectional views of an LCD with an integrated touch sensing device according to another embodiment of the present invention;

FIG. 3(*a*)-3(*c*) show schematically a fabricating process of an LCD with an integrated touch sensing device according to one embodiment of the present invention;

FIG. 4 shows schematically 4(*a*) a set of display units of an LCD and 4(*b*) a matrix of sensor units integrated with the LCD according to one embodiment of the present invention.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1-5. In accordance with the purposes of this invention, as embodied and broadly described herein, this invention, in one aspect, relates to an LCD having a touch sensing device integrated thereon.

FIGS. 1(*a*)-1(*e*) show schematically an LCD 100 with an integrated touch sensing device according to one embodiment of the present invention. The LCD 100 includes a first substrate 110 and a second substrate 180 arranged to be substantially parallel to and apart from the first substrate 110. Typically, the first substrate 110 and the second substrate 180 are separated from one another with one or more spacers. The first substrate 110 and the second substrate 180 are formed of a transparent material such as glass.

The LCD 100 also includes a touch sensing device having a first coordinate detecting layer 120 including a plurality of X electrodes 125 parallel and regular-spacingly formed on the first substrate 110 and connected by connection lines 135X along an X-direction, an insulating layer 130 formed on the first coordinate detecting electrode layer 120, and a second coordinate detecting layer 140 including a plurality of Y electrodes 145 parallel and regular-spacingly formed on the insulating layer 130 and connected by connection lines 135Y along a Y-direction that is substantially perpendicular to the X-direction. The insulative layer 130 is formed of a transparent, non-conductive material, or a non-transparent, non-conductive material. The plurality of X electrodes 125 and the plurality of Y electrodes 145 are adapted for detecting a location of a touch point in the first substrate 110. In this embodiment as shown in FIGS. 1(a)-1(d), the touch sensing device has two conductive layers for connection lines 135X and 135Y in the crossover portions for the plurality of X electrodes 125 and the plurality of Y electrodes 145, and a single conductive layer in the other portions. In a modified embodiment, the first coordinate detecting layer 120 and the second coordinate detecting layer 140, the touch sensing device is effectively formed with a single conductive layer excepting the connection lines 135X and 135Y in the crossover portions.

The LCD 100 further includes a color filtering matrix having a plurality of red (R), green (G) and blue (B) color pads 150. Each color pad 150 is formed on the first substrate 110 in a corresponding space defined by X electrodes 125 and Y electrodes 145. The LCD 100 also includes a transparent overcoat layer 160 formed on the color filtering matrix and uncovered portions of the insulating layer 130 and the plurality of Y electrodes 145. Furthermore, a common electrode 170 is formed on the transparent overcoat layer 160. The common electrode 170 is formed of a thin transparent layer of a transparent, conductive material, such as ITO. Each of the plurality of X electrodes 125 and the plurality of Y electrodes 145 is configured to capacitively couple to a human's finger, and associated with coordinates of the first substrate 110 at which the electrode is located, such that when a user's finger touches to the first substrate 110, a capacitively coupled R-C circuit from one or more of the plurality of X electrodes 125 and the plurality of Y electrodes 145 to the human body is established, thereby causing current variation from the one or more electrodes at the touch point. By measuring the current variation, the location of the touch point can be derived.

Figure 1A:
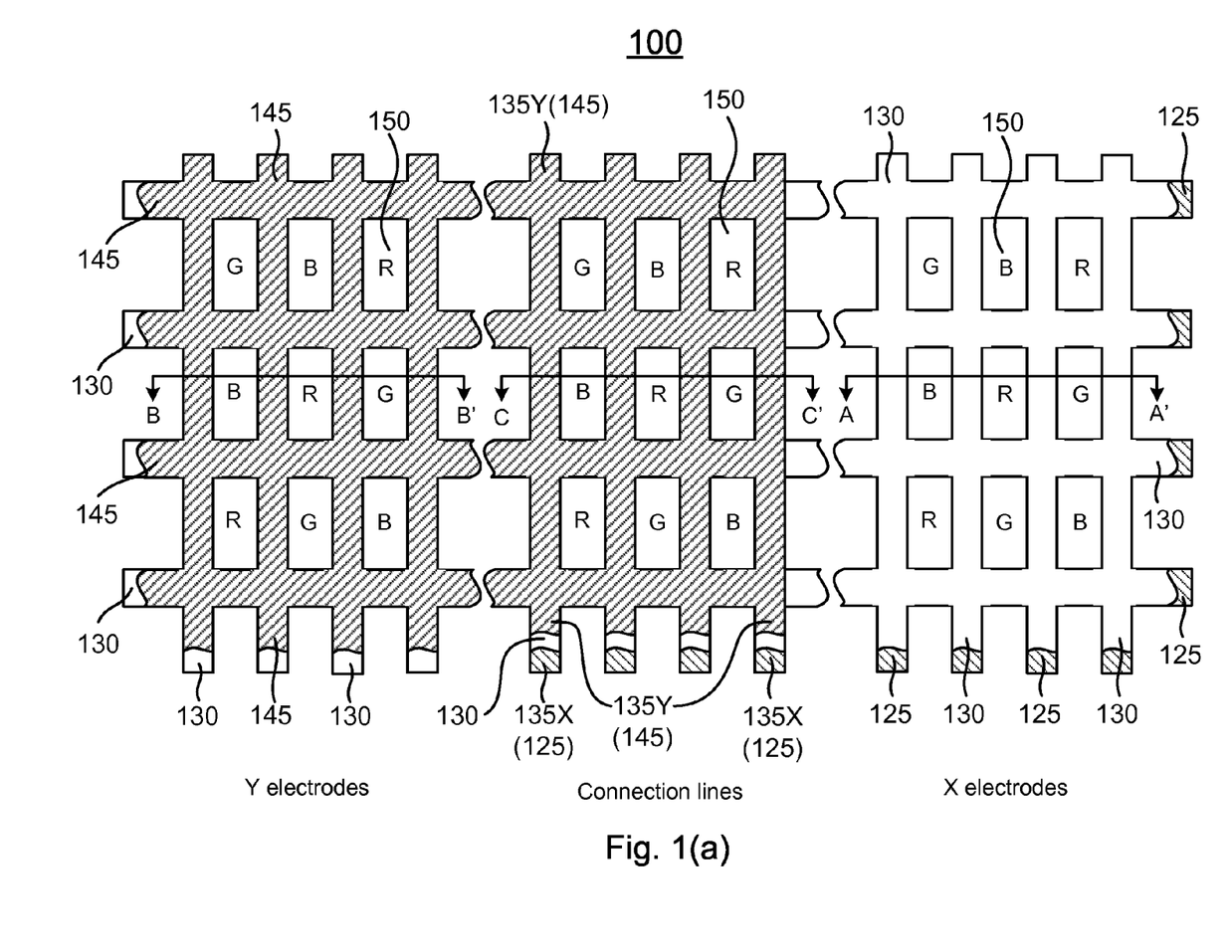
Figure 1B:
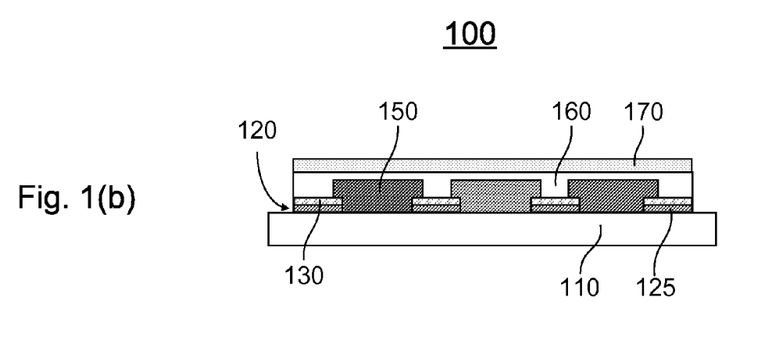
Figure 1C:
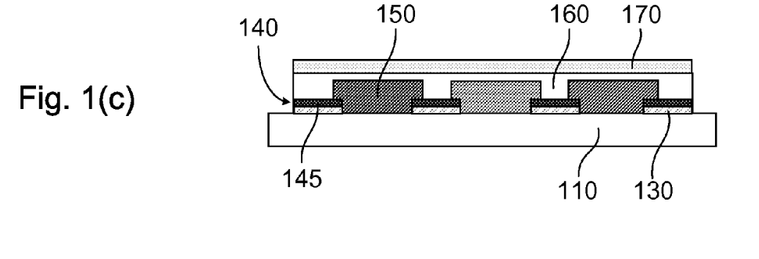
Figure 1D:
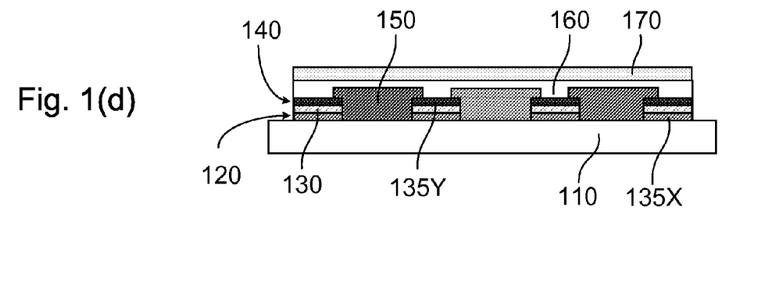
Figure 1E:
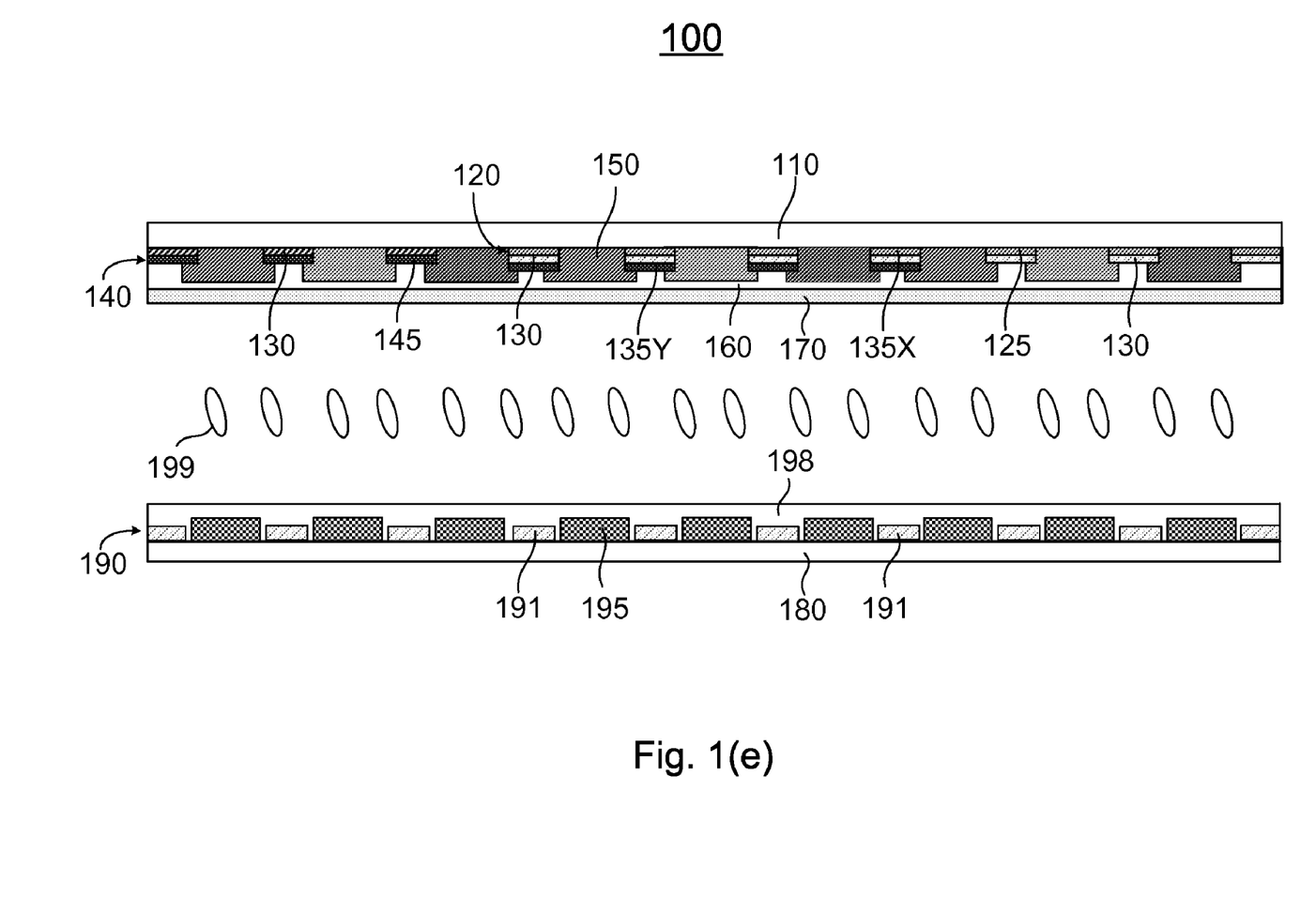

Furthermore, the LCD 100 includes a pixel layer 190 having a plurality of pixel electrodes 195 and a plurality of semiconductor devices 191 formed on the second substrate 190, and a liquid crystal material 199 disposed between the common electrode 170 and the pixel layer 190, as shown in FIG. 1(e). Each semiconductor device 199 may include a liquid crystal capacitor, a storage capacitor, and a thin film transistor (TFT), which is electrically coupled to a corresponding pixel electrode, liquid crystal capacitor and storage capacitor. Additionally, a plurality of data lines and a plurality of gate lines (not shown) are formed on the second substrate 180 in the area where no pixel electrode 195 is formed. The plurality of data lines and a plurality of gate lines are adapted for connecting the plurality of pixel electrodes 195 and the plurality of semiconductor devices 199 to a gate driver and a data driver, respectively.

The first substrate 110 and the second substrate 180 are aligned such that each color pad 150 on the first substrate 110 is positioned opposite a corresponding pixel electrode 195 on the second substrate 180, and the plurality of X electrodes 125 and the plurality of Y electrodes 145 on the first substrate 110 are positioned opposite the plurality of semiconductor devices 199 on the second substrate 180, as shown in FIG. 1(e). The plurality of X electrodes 125 and the plurality of Y electrodes 145 are formed of a non-transparent, conductive material such as chromium and/or chromium oxide, or other suitable material that has low reflectivity and blocks the transmission of light. An additional anti-reflective material or low reflective material (not shown) can be formed on the X electrodes 125 and the Y electrodes 145 to reduce light reflecting. In this configuration, the plurality of X electrodes 125 and the plurality of Y electrodes 145 have dual functions of touch sensors and a black matrix.

Such a configuration not only makes the overall LCD device thinner, thereby reducing the size and weight of the LCD device, but also enhances light transmission for the coordinate display panel because of using fewer elements comparing to conventional touch sensing LCD devices.

Figure 2A:
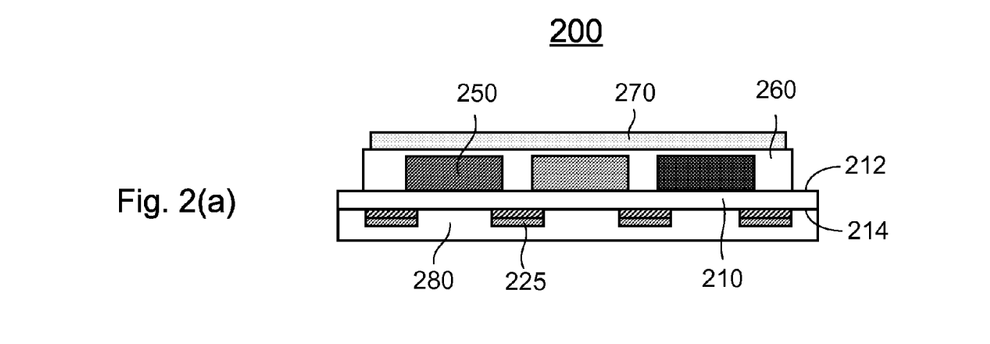
Figure 2B:
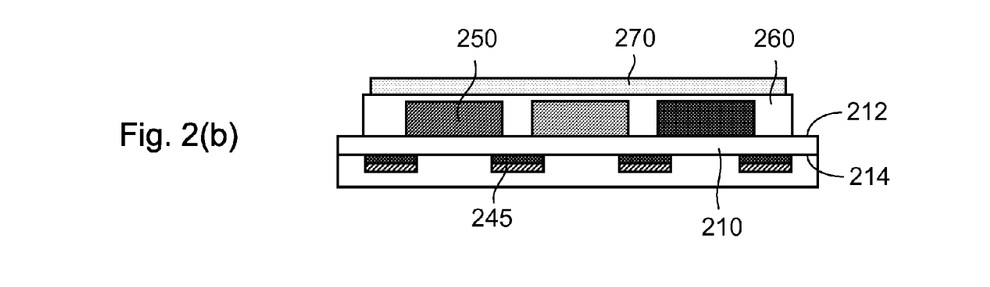
Figure 2C:
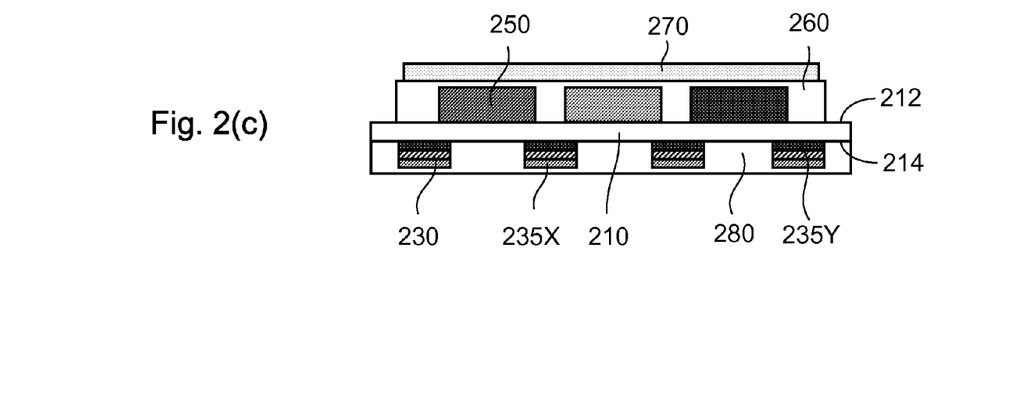

FIGS. 2(a)-2(c) shows schematically another embodiment of an LCD 200 with an integrated touch sensing device according to the present invention. The structure of the LCD 200 is similar to that of the LCD 100 as shown in FIGS. 1(a)-1(e), except that the touch sensing device is formed on a second surface 214 of a first substrate 210, which is opposite a first surface 212 of the first substrate 210 on which a color matrix 250 is formed. In the exemplary embodiment, the touch sensing device includes a plurality of X electrodes 225 parallel and regular-spacingly aligned and connected by connection lines 235X along an X-direction, and a plurality of Y electrodes 245 parallel and regular-spacingly aligned and connected by connection lines 235Y along a Y-direction that is substantially perpendicular to the X-direction. Additionally, an insulating layer 230 is deposited between the plurality of X electrodes 225 and the plurality of Y electrodes 245. An overcoat layer 280 can be formed of transparent, insulative material on the touch sensing device.

On the other surface 212 of the first substrate 210, the color matrix including a plurality of R, G, B color pads 150 is deposited such that the location of each color pad 250 is opposite a corresponding area defined by two neighboring X electrodes 225 and two neighboring Y electrodes 245 crossover the two neighboring X electrodes 225 on the second surface 214 of the first substrate 210. The color matrix is covered by a transparent, non-conductive layer 260. A common electrode 270 is then formed on the transparent, non-conductive layer 260. The plurality of X electrodes 225 and the plurality of Y electrodes 245 are configured to capacitively couple to the common electrode 270 for detection of a location of a touch point. Therefore, when a user' finger touches to the overcoat layer 280, a capacitively coupled R-C circuit from one or more of the plurality of X electrodes 225 and the plurality of Y electrodes 245 to the human body is established, thereby causing current variation from the one or more electrodes at the touch point, which are measured and adapted for detection of the location of the touch point.

Additionally, the touch sensing device may act as a black matrix, when the plurality of X electrodes 225 and the plurality of Y electrodes 245 formed of a non-transparent, conductive material.

Figure 3A:
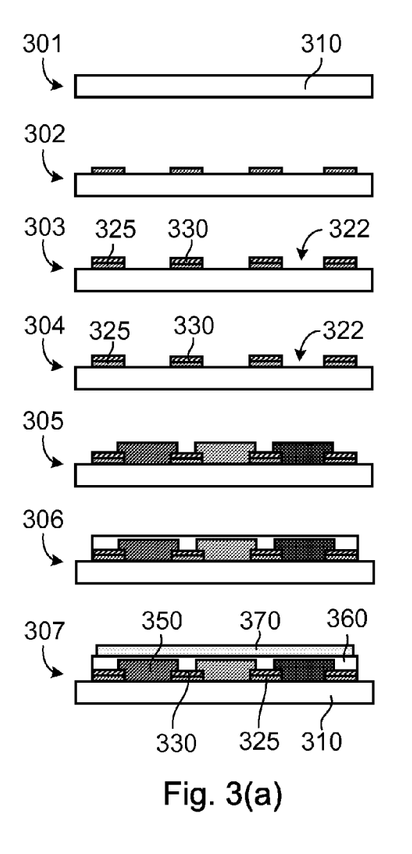
Figure 3B:
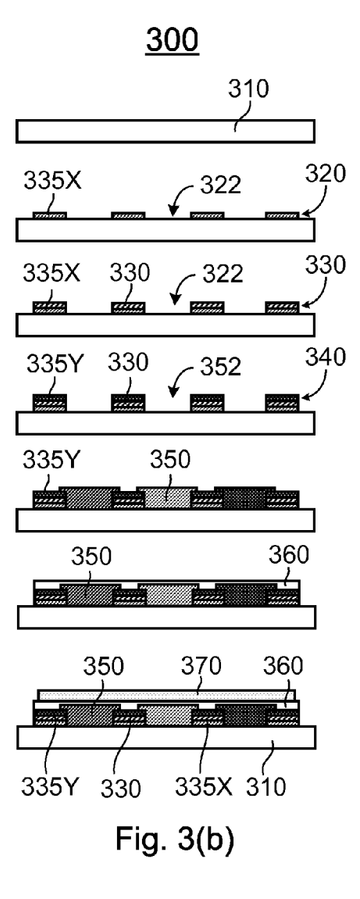
Figure 3C:
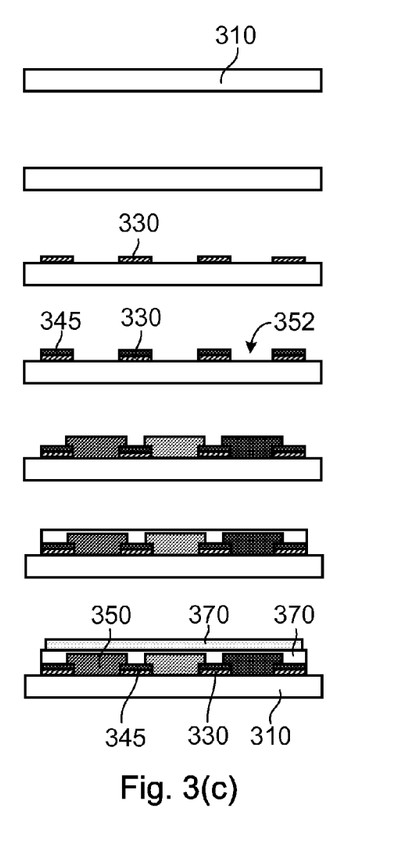

Referring to FIGS. 3(a)-3(c), a fabricating process 300 of a touch sensing device integrated with a color matrix is schematically shown according to one embodiment of the present invention. First, at step 301, a transparent glass substrate 310 is provided. Then at step 302, a first non-transparent, conductive material is deposited on the substrate 310 to form a first coordinate detecting layer 320 thereon. The first coordinate detecting layer 320 is patterned into a plurality of X electrodes 325 parallel and regular-spacingly and connected by connection lines 335X along an X-direction. Each X electrodes 325 define a plurality of spaces 322 therein. At step 303, an electrically non-conductive material is deposited on the first coordinate detecting layer 320 to form an insulative layer 330 thereon. At step 304, a second non-transparent, conductive material is deposited on the insulative layer 330 to form a second coordinate detecting layer 330 thereon. The second coordinate detecting layer 330 is then patterned into a plurality of Y electrodes 345 parallel and regular-spacingly and connected by connection lines 335Y along a Y-direction that is perpendicular to the X-direction. Each Y electrodes 245 define a plurality of spaces 352 therein. The patterned X and Y electrodes 325 and 345 define a matrix of spaces 322 and 352. The first and second non-transparent, conductive materials can be an identical material or two substantially different materials.

At step 305, a color matrix having a plurality of R, G, B color pads is formed of R, G, B color materials on the first substrate 310 such that each color pad 350 of a corresponding color material is deposited into a corresponding space 352 defined by X electrodes 325, Y electrodes 345 and connection lines 335X, 335Y.

At step 306, a transparent, non-conductive material is deposited on the color matrix to form an overcoat layer 360 thereon. At step 307, a common electrode layer 370 is formed of a transparent, conductive material, such as ITO, on the overcoat layer 360.

Figure 4A:
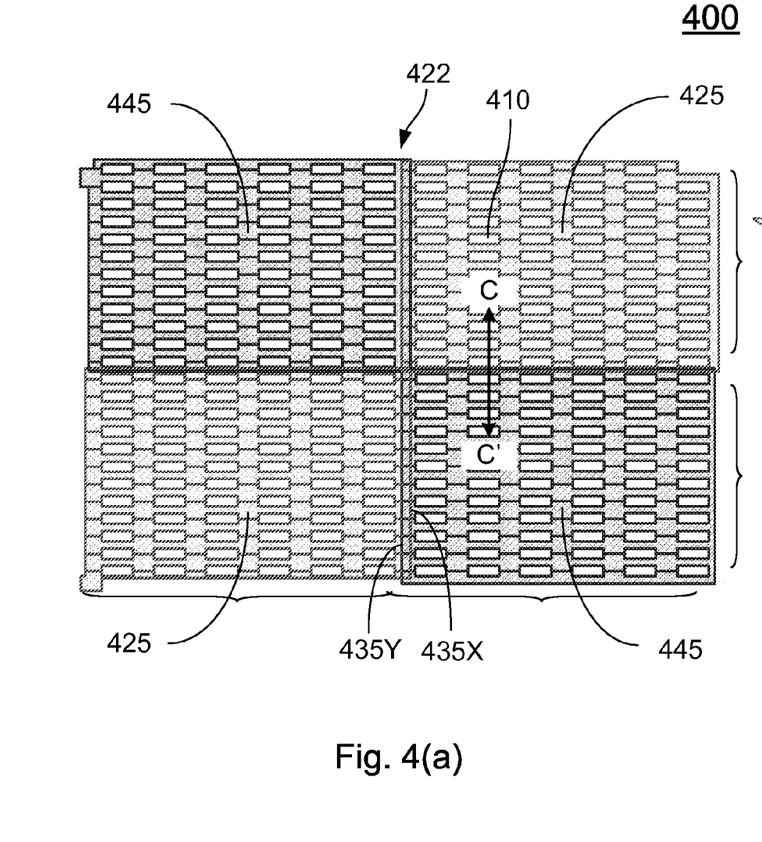
Figure 4B:
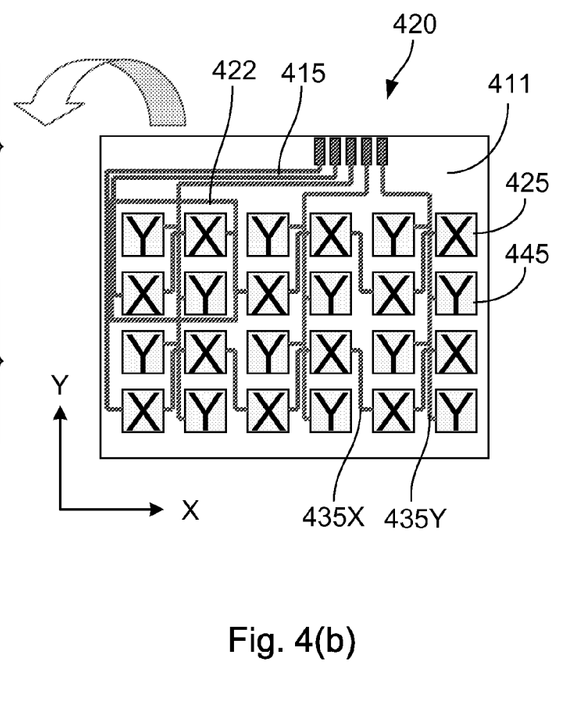
Figure 5:
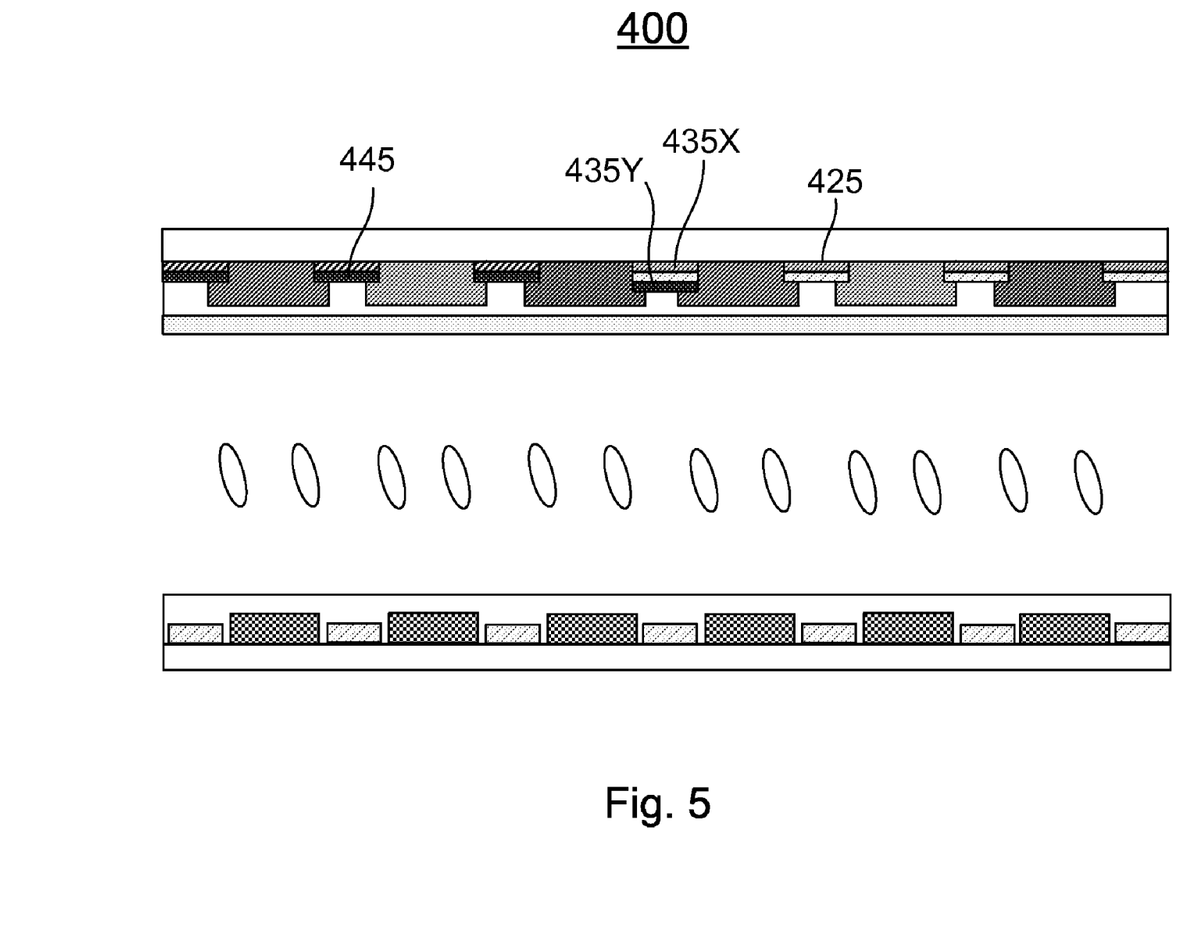
FIG. 5 shows schematically cross sectional view corresponding to FIG. 4.

FIG. 4 shows schematically an LCD 400 with an integrated touch sensing device according to another embodiment of the present invention. FIG. 5 shows schematically cross sectional view corresponding to FIG. 4 in adjacent X, Y electrodes and crossover portion. The LCD 400 includes a first substrate, a color matrix formed on the first substrate, and a common electrode formed on the color matrix, a second substrate spaced from the first substrate, a pixel electrode matrix formed on the second substrate, a liquid crystal material disposed between the common electrode and the pixel electrode matrix. The color matrix includes a plurality of R, G, and B color pads and is formed between the first substrate and the common electrode. The pixel electrode matrix, together with the color matrix, defines a matrix of display units 410, which is partially shown in FIG. 4(a). In other words, each display unit 412 is associated with a pixel electrode of the pixel electrode matrix and a corresponding color pad of the color matrix, and therefore with coordinates of the LCD panel.

The touch sensing device 420 includes a matrix of touch sensor units 422 that include a plurality of X electrodes 425 connected in series by a plurality of connection lines 435X along an X-direction (row) and a plurality of Y electrodes 445 connected in series by a plurality of connection lines 435Y along a Y-direction (column), as shown in FIG. 4(b). Each connection lines 435X, 435Y is electrically connected to external circuit by a plurality of control lines 415. In this embodiment, each touch sensor unit 422 has four touch sensors {Y, X; X, Y}, i.e. X electrodes 425 and Y electrodes 445, forming a two by two matrix aligned in the X-direction and the Y-direction, where each two diagonal touch sensors (Y-Y and X-X) are electrically connected. The connection lines 435X and 435Y are narrowed only between two adjacent display units 412. Each touch sensor (X or Y) is made of a non-transparent, conductive material such as chromium or the like. The matrix of touch units 422 is formed on a side of the first substrate of the LCD, which is opposite the side of the first substrate on which the color matrix is formed. Alternatively, the matrix of touch units 422 can be formed on the same side of the first substrate as that on which the color matrix is formed. The matrix of touch units 422 is configured to capacitively couple to the user's finger and associated with the matrix of display units 410. The touch sensing device 420 may include an overcoat layer 411 formed of a transparent, non-conductive material on the matrix of touch sensor units 422.

In this exemplary embodiment of FIG. 4, each touch sensor (X or Y) is associated with six by twelve display units 412. When a user's finger touches to the substrate 411, a capacitively coupled path (R-C circuit) from the touch point (sensor) to the user's finger is established, thereby, generating a current variant from the touch point (sensor). The location of the touch point (sensor) is detectable by measuring the current variation. Then, a function, if any, associated with the touch location is displayed on the display units 410 of the LCD associated with the touch unit 412.

The present invention, among other things, discloses an LCD having a dual functional touch sensing device integrated with a color matrix of the LCD.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display (LCD), comprising:
   a first substrate;
   a first coordinate detecting layer having a plurality of X electrodes and a plurality of first connection lines, the X electrodes being parallel to each other and regular-spacingly formed on the first substrate along an X-direction, and the X electrodes being connected by the first connection lines therebetween;
   an insulating layer formed on the first coordinate detecting electrode layer;
   a second coordinate detecting layer having a plurality of Y electrodes and a plurality of second connection lines with a plurality of openings, the Y electrodes being parallel to each other and regular-spacingly formed on the insulating layer along a Y-direction that is substantially perpendicular to the X-direction, the Y electrodes being connected by the second connection lines therebetween, each of the plurality of X electrodes and the plurality of Y electrodes being formed of a non-transparent, conductive material, the X electrodes and the Y electrodes being not overlapped, the first connection lines and the second connection lines being overlapped and insulated by the insulating layer, wherein the first coordinate detecting layer, the insulating layer and the second coordinate detecting layer define a plurality of openings exposing the first substrate, and the plurality of X electrodes, the plurality of Y electrodes, the first connection lines and the second connection lines are configured to be a black matrix with the openings;
   a color filtering matrix having a plurality of color pads, each color pad formed in one of the plurality of openings correspondingly;
   a transparent overcoat layer formed on the color filtering matrix, the insulating layer and the plurality of Y electrodes;
   a second substrate spaced from the first substrate;
   a pixel layer having a plurality of pixel electrodes and a plurality of semiconductor devices formed on the second substrate; and
   a liquid crystal material disposed between the common electrode and the pixel layer.

2. The LCD of claim 1, wherein each of the first substrate and the second substrate is formed of a transparent material.

3. The LCD of claim 1, wherein the insulating layer is formed of a non-conductive material.

4. The LCD of claim 1, wherein each of the plurality of semiconductor devices comprises a thin film transistor (TFT), electrically coupled to a corresponding pixel electrode.

5. The LCD of claim 1, wherein the first substrate and the second substrate are aligned such that each color pad on the first substrate is positioned opposite a pixel electrode correspondingly on the second substrate.

6. The LCD of claim 1, wherein each of the plurality of X electrodes and the plurality of Y electrodes is associated with coordinates of the first substrate at which the electrode is located.

7. The LCD of claim 1, wherein when the first substrate is touched, the touch location at the first substrate is detectable by measuring a signal generated responsively by one or more of the plurality of X electrodes and the plurality of Y electrodes at the touch location.

8. The LCD of claim 1, further comprising a common electrode formed on the transparent overcoat layer.

9. The LCD of claim 8, wherein the common electrode is formed of a layer of a transparent, conductive material.

10. The LCD of claim 1, wherein when the first substrate is touched, the touch location at the first substrate is detectable by measuring a signal generated responsively by one or more of the plurality of X electrodes and the plurality of Y electrodes at the touch location.

11. A liquid crystal display (LCD), comprising:
a first substrate having a first surface and a second surface opposite to the first surface;
a touching sensing member formed on the second surface of the first substrate, the touch sensing member comprising a plurality of X electrodes, a plurality of Y electrodes, a plurality of first connection lines, a plurality of second connection lines and an insulating layer, the X electrodes being parallel to each other and regular-spacingly aligned along the X-direction, the X electrodes being connected by the first connection lines therebetween, the plurality of Y electrodes being parallel to each other and regular-spacingly aligned along the Y-direction, the Y electrodes being connected by the second connection lines therebetween, the X electrodes and the Y electrodes being not overlapped, the first connection lines and the second connection lines being overlapped, the insulating layer being formed between the first connection lines and the second connection lines, each of the plurality of X electrodes and the plurality of Y electrodes being formed of a non-transparent, conductive material, wherein the first coordinate detecting layer, the insulating layer and the second coordinate detecting layer define a plurality of openings exposing the first substrate;
a color filtering layer formed on the first surface of the first substrate, the color filtering layer being patterned in the form of a color matrix having a plurality of color pads, each of the color pads being aligned to one of the plurality of openings correspondingly;
a transparent overcoat layer formed on the color filtering layer;
a second substrate spaced from the first substrate and facing to the first surface of the first substrate;
a pixel electrode layer formed on the second substrate; and
a liquid crystal material disposed between the common electrode and the pixel electrode layer.

12. The LCD of claim 11, wherein the insulating layer is formed of a non-conductive material.

13. The LCD of claim 11, wherein the touch sensing member further comprises an overcoat layer formed over the plurality of X electrodes and the plurality of Y electrodes.

14. The LCD of claim 11, further comprising a black matrix interleaved with the plurality of color pads.

15. The LCD of claim 11, wherein each of the first substrate and the second substrate is formed of a transparent material.

16. The LCD of claim 11, wherein the insulating layer is formed of a non-conductive material.

17. The LCD of claim 11, further comprises a common electrode formed on the transparent overcoat layer.

18. The LCD of claim 17, wherein the common electrode is formed of a layer of a transparent, conductive material.

19. The LCD of claim 11, wherein when the first substrate is touched, the touch location at the first substrate is detectable by measuring a signal generated responsively by one or more of the plurality of X electrodes and the plurality of Y electrodes at the touch location.

* * * * *